United States Patent [19]

Kurata

[11] 3,768,020

[45] Oct. 23, 1973

[54] GROUP DELAY TIME CORRECTING CIRCUIT INCLUDING A TOULON CIRCUIT FOR USE IN AN INTERMEDIATE-FREQUENCY AMPLIFYING CIRCUIT

[75] Inventor: Hirotaka Kurata, Tokyo, Japan

[73] Assignee: Sansui Electric Co., Ltd., Tokyo, Japan

[22] Filed: Dec. 29, 1971

[21] Appl. No.: 213,615

[30] Foreign Application Priority Data

Dec. 29, 1970 Japan .............................. 45/121486

[52] U.S. Cl. .............. 325/347, 179/15 BT, 325/472

[51] Int. Cl. .............................................. A04b 1/06

[58] Field of Search .................... 325/347, 369, 378, 325/379, 383, 385, 387, 45, 46, 323, 324, 472, 475, 477, 476, 344, 345; 333/17, 70 T; 179/15 BT

[56] References Cited

UNITED STATES PATENTS

| | | | |
|---|---|---|---|
| 3,525,946 | 8/1970 | Grace | 325/347 |
| 3,177,433 | 4/1965 | Simon et al. | 333/70 T |
| 3,505,603 | 4/1970 | Hoban | 325/383 |

*Primary Examiner*—Albert J. Mayer

*Attorney*—Richard C. Sughrue et al.

[57] ABSTRACT

A group delay time correcting circuit including a toulon circuit for use in an intermediate-frequency amplifying circuit. The intermediate-frequency amplifying circuit is comprised of an amplitude limiter, a group delay time correcting circuit and a detector circuit coupled to the output of the group delay time correcting circuit. The group delay time correcting circuit includes a differential amplifier for converting the input signals thereto from the amplitude limiter into two signals equal in amplitude but opposite in phase. The output of the differential amplifier is applied to a Toulon circuit comprised of a series connected reactance circuit and a resistor. The output of the Toulon circuit is taken at the junction between the reactance circuit and the resistor. The reactance circuit of the Toulon circuit is constructed so as to have at least one resonance point and one anti-resonance point.

5 Claims, 18 Drawing Figures

GROUP DELAY TIME CORRECTING CIRCUIT INCLUDING A TOULON CIRCUIT FOR USE IN AN INTERMEDIATE-FREQUENCY AMPLIFYING CIRCUIT

BACKGROUND OF THE INVENTION

This invention relates to an intermediate-frequency amplifying circuit including a group delay correcting circuit.

As well known in the art, one prerequisite for an intermediate-frequency amplifying circuit is a good selectivity; but, as the selectivity is improved, the characteristic of group delay in the range of the intermediate-frequency becomes un-flat or exhibits an arcuate curve as shown in FIG. 1 attached herewith. Thus, when a received signal is frequency-modulated or phase-modulated, the detected output from the received signal is distorted. This distortion may generate "cross-talk" between plural channels if the modulated signal is the so-called composite signal, such as a modulated signal in the FM stereo-system, and have a large influence on the performance of such systems thereby resulting in inconveniences.

Therefore, it is an object of the invention to provide an intermediate-frequency amplifying circuit which provides a flat group delay characteristic and improvements on the tone quality without affecting the selectivity characteristic (or the amplitude characteristic).

It is another object of the invention to provide the above type amplifying circuit including a group delay time correcting circuit.

It is still another object of the invention to provide the above type amplifying circuit with an overall group delay time which can be easily adjusted.

SUMMARY OF THE INVENTION

According to the invention, there is provided an intermediate-frequency amplifying circuit adapted to be connected to a tuning circuit. Generally, the intermediate-frequency amplifying circuit includes in series an amplitude limiter, a group delay time correcting circuit, and a detector circuit. Specifically, the group delay time correcting circuit provides a desired delay characteristic to compensate for the overall delay characteristic of the device, and includes means for converting an input signal to two signals of the same amplitude but having a phase difference of 180° and a Toulon circuit receiving the two signals and including in its one branch a reactance circuit having at least one resonance point and one anti-resonance point, so that by selecting these resonance and anti-resonance points any desired delay characteristic may be provided. More specifically, the reactance circuit comprises one capacitor and one or more series connected parallel circuits each consisting of a capacitor and a reactor.

DESCRIPTION OF THE PREFERRED EMBODIMENTS

Figure 2:
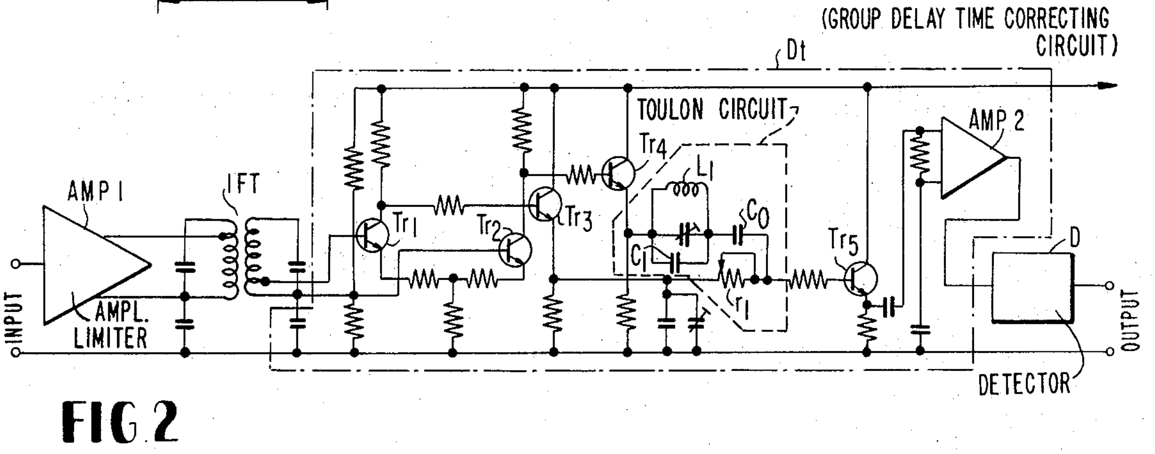
FIG. 2 is a circuit diagram of an embodiment of an intermediate-frequency amplifying circuit according to the invention.

Referring now to the drawing, embodiments of the invention will be described. FIG. 2 shows a main portion of an intermediate-frequency amplifying circuit according to the invention. In this drawing, an amplitude limiter, Amp 1, has an input end to be connected to a tuning circuit (not shown) and an output end coupled to an intermediate-frequency transformer, IFT. The output end of the intermediate-frequency transformer IFT is coupled through a group delay time correcting circuit Dt to a detector circut D the output end of which may be coupled to a low-frequency amplifying circuit (not shown).

The aforementioned group delay time correctinc circuit Dt is constructed so that the signal at its input end is applied to a differential amplifier comprising transistors $Tr_1$ and $Tr_2$, thus, two signals having the same amplitude but a phase difference of 180° therebetween appear at respective emitters of transistors $Tr_3$ and $Tr_4$. Then, these resulting signals are added together through a three-element reactance circuit which includes parallel connected capacitor $C_1$ and reactor $L_1$ and another capacitor $C_0$ connected in series with the former parallel circuit, and through a resistor $r_1$, the added resulting signal is extracted from the emitter of a transistor $Tr_5$ with its collector grounded forming an emitter follower and applied to a buffer amplifier, Amp 2, to amplify it, wherein the output end of the amplifier Amp 2 is designed so as to be matched to the succeeding stage or the detector circuit D.

Figure 3:
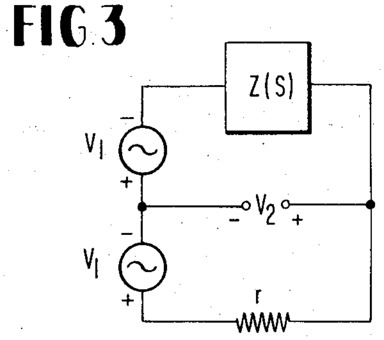
FIG. 3 is a circuit diagram of a basic equivalent circuit of a delay circuit included in the embodiment shown in FIG. 2.

The basic equivalent circuit of this group delay time correcting circuit D*t* can be represented in the form of a Toulon circuit (a phase shifter) as shown in FIG. 3. That is, the output of the differential amplifier, the output of the emitter follower, and the three-element reactance circuit correspond to an input signal $V_1$, an output signal $V_2$, and a block Z(s), respectively. The transfer function of the circuit shown in FIG. 3 can be obtained from the following basic equation:

$$V_2 = X(x) - R/Z(s) + R\ V_1 \ldots \quad (1)$$

Now it is assumed that the $Z(s)$ can be represented in the form of a reactance function as follows:

$$Z(s) = K(S^2 + \omega_1^2)(S^2 + \omega_{22})(S^2 + 107_5^2)\ldots/S(S^2 + \omega_2^2)(S^2 + \omega_4^2)(S^2 + \omega_6^2)\ldots \quad (2)$$

Then, if it is possible that $Z(j\,\omega) = jX(\omega)$, equation (1) becomes as follows:

$$V_2 = jX(\omega) - R/jX(\omega) + R\ V_1 \ldots \quad (3)$$

Since the amplitude of equation (3) meets the relation "$|V_2| = |V_1|$", *it is independent of frequency and the amplitude characteristic is flat.*

On the other hand, a phase $\phi(\omega)$ in equation (3) or between $V_2$ and $V_1$ can be represented by the following equation:

$$\phi(\omega) = \pi - 2\tan^{-1} X(\omega)/R \ldots \quad (4)$$

Further, a group delay time $\tau(\omega)$ can be given by the following equation:

$$\tau(\omega) = -d\,\phi(\omega)/d\omega$$
$$= 2\,d/d\omega\,(\tan^{-1} X(\omega)/R) \ldots \quad (5)$$

As will be apparent from the above equation (5), the group delay characteristic can be varied by varying the phase.

For example, in case the block Z(s) is a three-element reactance circuit such as is shown in FIG. 2, the reactance function Z(s) becomes as follows:

$$Z(s) = C_o + C_1/C_oC_1\,S^2 + 1/\,L(C_3 + C_1)/S\,(S^2 + 1/LC_1) \ldots \quad (6)$$

that is, $$Z(j\omega) = -j\,K/\omega a_o - \omega^2\,/b_1 - \omega^2 \ldots \quad (7)$$

where, $K = C_o + C_1/C_oC_1$, $a_o = 1/L(C_o + C_1)$, and $b_1 = 1/LC_1$.

Figure 4:
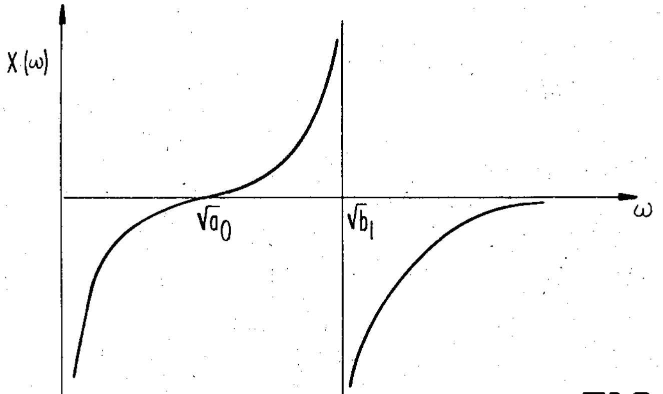
FIGS. 4 through 7 illustrate characteristic curves used in explaining the operation of the embodiment shown in FIG. 2.

Further, the following equatiion is obtained:

$$X(\omega) = -\,K/\omega a_o - \omega^2/b_1 - \omega^2 \ldots \quad (8)$$

and thus, the value of $X(\omega)$ will vary as shown in FIG. 4. Accordingly, the group delay time $\tau(\omega)$ which will be obtained on the basis of equation (5) will vary as shown in FIG. 5.

Figure 1:
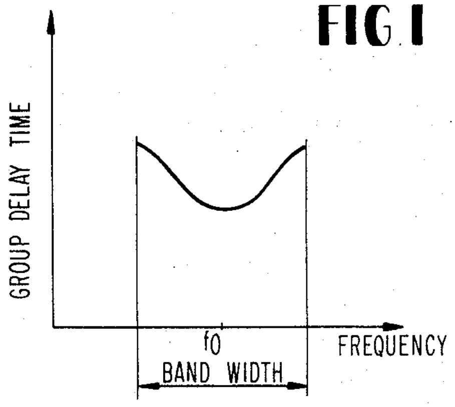
FIG. 1 is a graph showing a group delay characteristic of a conventional intermediate-frequency amplifying circuit.
Figure 5:
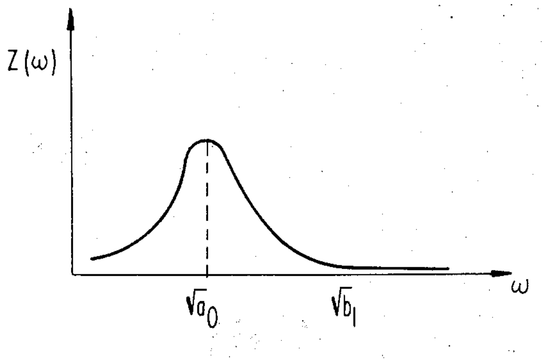
Figure 6:
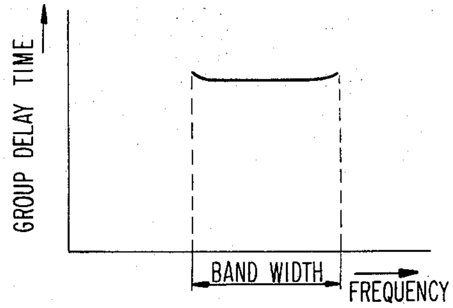
Figure 7:
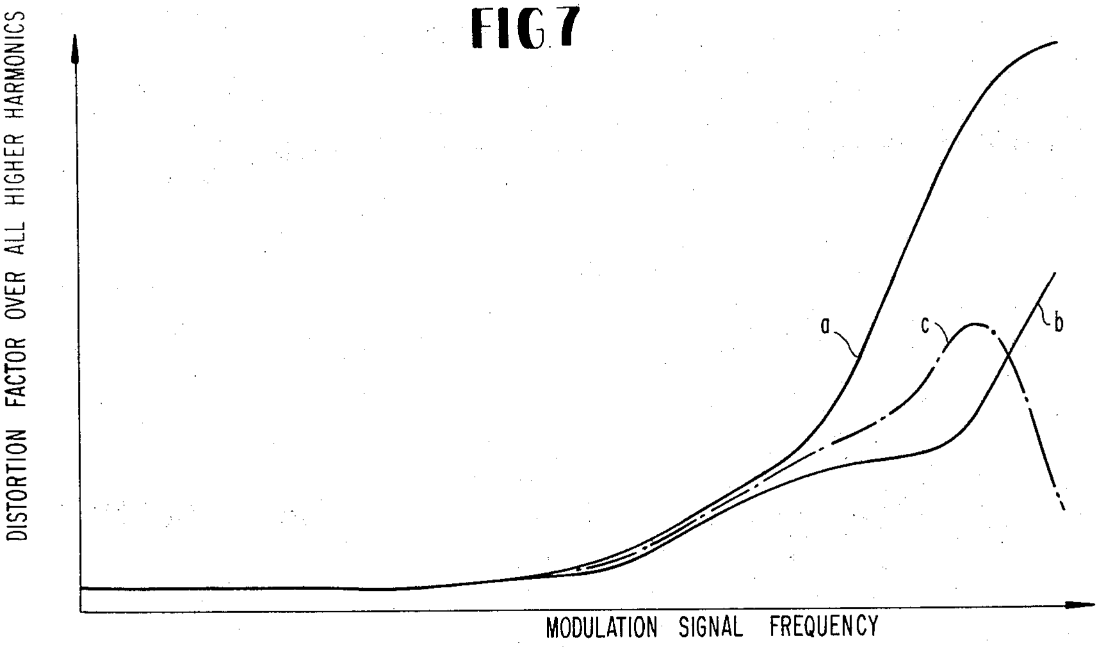

Now, in comparison of the group delay time characteristics of FIG. 1 and FIG. 5, if "$2\pi f_o = \sqrt{a_o}$" is assumed, it will be seen that one of the above group delay time characteristics corresponds substantially to the inverse of the other characteristic with the center of $\sqrt{a_o}$. Therefore, the intermediate-frequency amplifying circuit according to the instant invention, which includes a delay circuit having the characteristic as shown in FIG. 5 added to a circuit having the characteristic shown in FIG. 1, may have an overall group delay time characteristic such as is shown in FIG. 6 which is flat within the desired band width to thereby provide a distortionless detected output. FIG. 7 shows an example of the relationship between a modulated signal frequency and the distortion factor over all higher harmonic waves. In the graph of FIG. 7, curve (a) is the characteristic before correcting, curves (b) and (c) are characteristics after correction by use of the instant device. It should be noted that these curves are the characteristics of distortion factor measured when the frequency shift or phase shift was maximum, so that other characteristic curves corresponding to the foregoing and obtained when the degree of frequency shift or phase shift is smaller than that of the curves shown in FIG. 7 may of course become improved in comparison with the illustrated condition.

Figure 8:
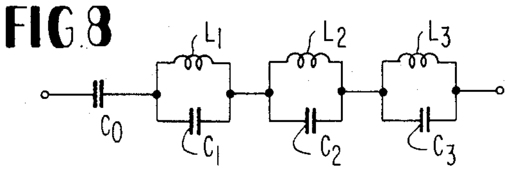
FIG. 8 is a circuit diagram of another embodiment of a reactance circuit of the delay circuit.

FIG. 8 shows another embodiment of the reactance circuit according to the instant invention, which is constructed on the basis of the reactance circuit shown in FIG. 2 and includes further, one parallel circuit of capacitor $C_2$ and reactor $L_2$ and another parallel circuit of capacitor $C_3$ and reactor $L_3$, both being connected in series with the circuit elements shown in FIG. 2. The Z(s) of this modified circuit is represented by the following equation:

$$Z(s) = K(S^2 + \omega_1^2)(S^2 + \omega_3^2)(S^2 + \omega_5^2)/S(S^2 + \omega_2^2)(S^2 + \omega_4^2)(S^2 + \omega_6^2)$$

thus, the $X(\omega)$ is given by $$X(\omega) = -K/\omega\,(\omega_1^2 - \omega^2)(\omega_3^2 - \omega^2)(\omega_5^2 - \omega^2)/(\omega_2^2 - \omega^2)(\omega_4^2 - \omega^2)(\omega_6^2 - \omega^2)$$

Figure 9:
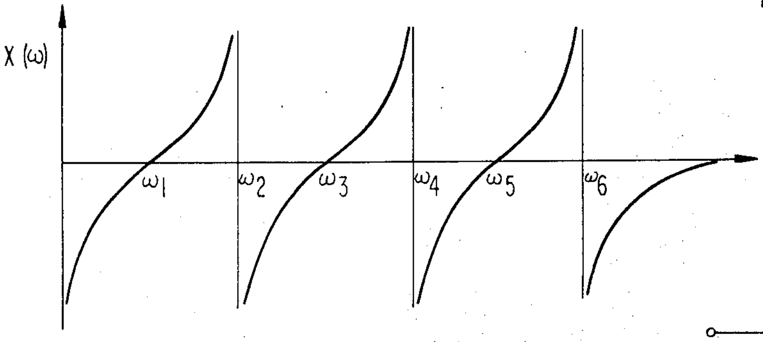
FIGS. 9 and 10 are graphs of the reactance function and the delay time of the reactance circuit shown in FIG. 8.
Figure 10:
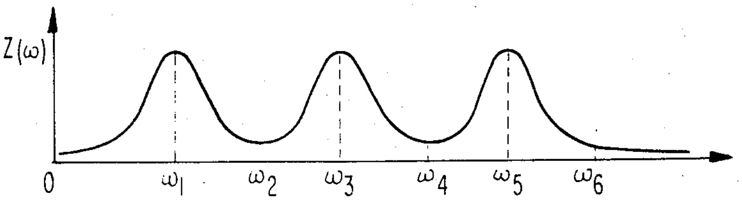

That is, the $X(\omega)$ varies as shown in FIG. 9 and the group delay time characteristic of the delay circuit including the reactance circuit of FIG. 8 is as shown in FIG. 10. In this case, if $\omega_2$ and $\omega_4$ are selected as to locate symmetrically with respect to $\omega_3$ and if $\omega_3 = \sqrt{a_o}$ is established, the degree of symmetry of the characteristic on both sides about $\omega_3$ can be improved whereby satisfactory correcting effect may be obtained.

Figure 11:
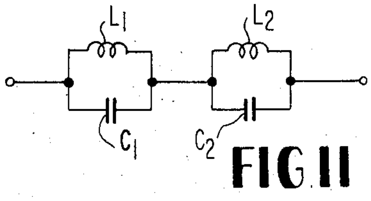
FIG. 11 is a circuit diagram of still another embodiment of the reactance circuit.

FIG. 11 shows another embodiment of the reactance circuit according to the invention, which includes one parallel circuit of capacitor $C_1$ and reactor $L_1$ and another parallel circuit of capacitor $C_2$ and reactor $L_2$ connected in series with the former. The Z(s) of this embodiment becomes as below:

$$Z(s) = K/S\ S^2\,(S^2 + \omega_1^2)/(S^2 + \omega_2^2)\,(S^2 + \omega_4^2)$$

and the $X(\omega)$ is given by $$X(\omega) = K\,(\omega_1^2 - \omega^2)/(\omega_2^2 - \omega^2)(\omega_4^2 - \omega^2)$$

Figure 12:
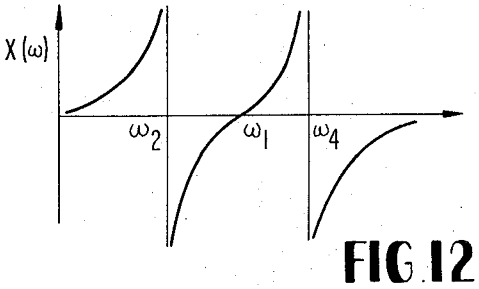
FIGS. 12 and 13 are graphs of the reactance function and the delay time of the circuit shown in FIG. 11.
Figure 13:
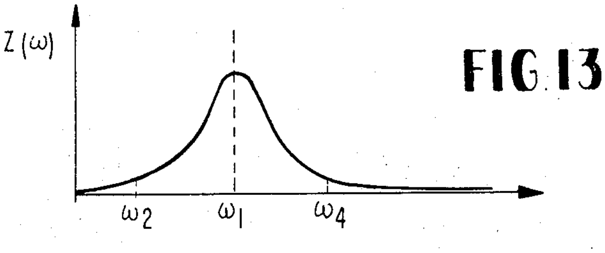

Accordingly, this $X(\omega)$ varies as shown in FIG. 12 and the group delay time characteristic of the delay circuit including the reactance circuit of FIG. 11 is as shown in FIG. 13. In this embodiment, if $\omega_2$ and $\omega_4$ are selected to be symmetrical with respect to $\omega_1$ and if $\omega_1 = \sqrt{a_o}$ is established, the degree of symmetry of the characteristic on both sides about $\omega_1$ will be improved whereby a satisfactory correcting effect can be provided.

If the group delay time characteristic shown in FIG. 1 is not symmetrical with respect to $f_o$, this can be corrected by shifting appropriately points of $\omega_2$ and $\omega_4$ shown in FIGS. 8 and 13.

Figures 14, 15:
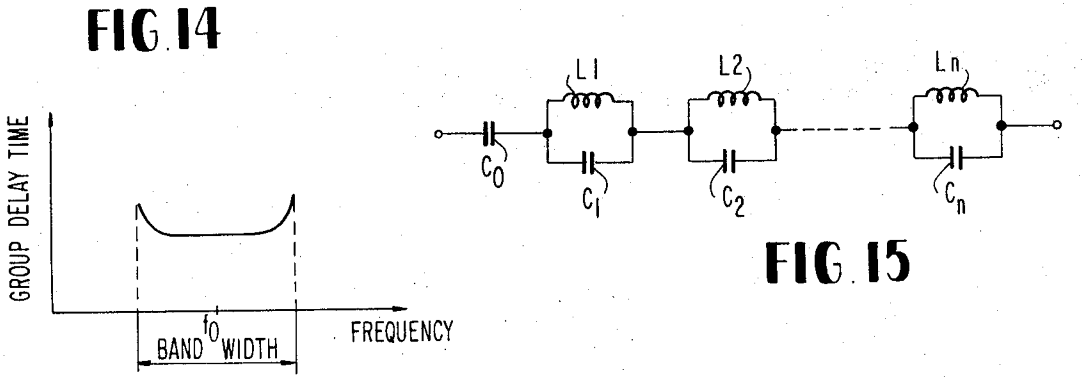
FIG. 14 is a graph of a general group delay characteristic obtained when the group delay time correcting circuit is not used.
FIG. 15 is a circuit diagram of still a further embodiment of the reactance circuit.
Figure 16:
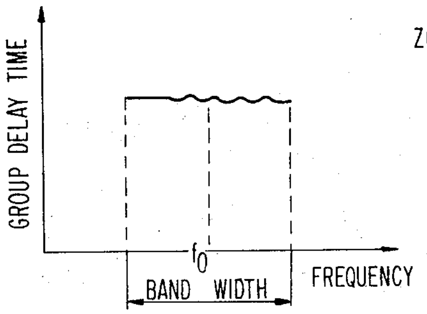
FIG. 16 is a graph of the delay time characteristic of the circuit shown in FIG. 15.
Figure 17:
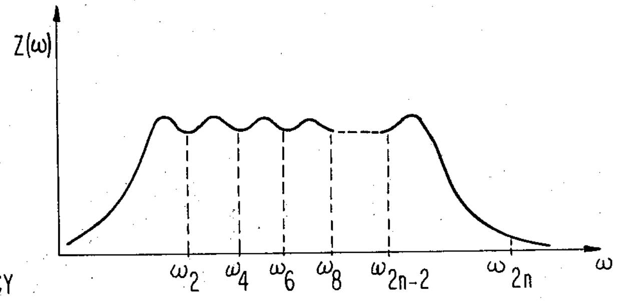
FIG. 17 is a graph of the group delay time characteristic obtained when the reactance circuit shown in FIG. 15 is employed.

In case the group delay characteristic, which results when the group delay time correcting circuit is not used, is substantially flat within the band width as shown in FIG. 14, but, varies abruptly around the limits of the band, the overall group delay characteristic can be made flat as shown in FIG. 17 by employing cascaded C-L parallel circuits such as is shown in FIG. 15 in order to let the group delay characteristic be such as is shown in FIG. 16. It should be noted that the capacitor $C_0$ in FIG. 15 can be removed from the circuit; however, this arrangement will provide substantially the same characteristic as that shown in FIG. 16.

Figure 18:
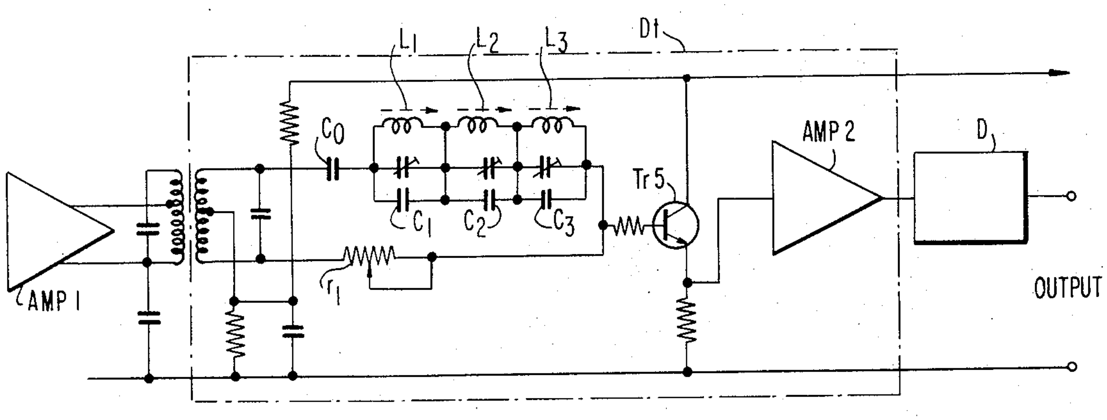
FIG. 18 is a circuit diagram of another embodiment of the intermediate-frequency amplifying circuit according to the invention.

FIG. 18 shows another embodiment of the intermediate-frequency amplifying circuit according to the instant invention. In this embodiment, the secondary winding of an intermediate-frequency transformer IFT connected to the output end of an amplitude limiter, Amp 1, has a neutral tap so that two signals of the same amplitude having a phase difference of 180° will be generated between the neutral tap and the ends of the winding. Similarly to the first embodiment, these signals are added together through the reactance circuit and a resistor $r_1$, and drawn out from the emitter of transistor $Tr_5$, whereby this embodiment also provides a delay time correcting effect similar to the first embodiment. Here, it should be noted that structural elements of the circuit of FIG. 18 bear the same reference numerals as that shown in FIG. 2, if they function likely, and are not described herein.

In FIG. 2, if two signals of the same amplitude but having a phase difference of 180° therebetween are previously provided without use of the differential amplifier, they can be applied directly to the circuit consisting of resistor $r_1$, capacitors $C_0$ and $C_1$ and reactor $L_1$. Further, the intermediate-frequency transformer IFT is not necessarily used, but this can be replaced by filter elements such as L-C block filters, ceramic filters, or crystal filters.

Though in the foregoing description the reactance function Z(s) was used to explain the instant invention, it is also possible to employ an admittance function, Y(s), in place of Z(s), and, in case the characteristic before correcting is very poor or the delay time difference between signals at the center frequency and the boundary frequencies of the band width is very large, such defects can be corrected by use of n stages of cascaded correcting circuits. The above modifications are, of course, within the spirit and scope of the instant invention and further modifications are also possible.

As described hereinabove, according to the instant invention, between the amplitude limiter and the detector circuit the delay circuit functioning as the group delay time correcting circuit is provided, which includes the Toulon circuit one circuit branch of which has a reactance circuit having at least one resonance point and one anti-resonance point, thus the overall group delay characteristic through the band-pass filter and the detector circuit inclusive of the intermediate-frequency transformer can be simultaneously corrected without affecting the selectivity characteristic, whereby the distortion factor can be remarkably reduced.

What is claimed is:

1. A group delay time correcting circuit for use in an intermediate-frequency amplifying circuit comprising:

a. means for converting an input signal to two signals having the same amplitude but with a phase difference of 180° therebetween, b. means for applying one of said signals to one terminal of a series circuit comprised of a reactance circuit and a resistor, and the other signal to the other terminal, respectively, said reactance circuit having at least one resonance point and one anti-resonance point, and c. means for taking an output signal from the connecting point between said reactance circuit and resistor.

2. An intermediate-frequency amplifying circuit as specified in claim 1 wherein said means for converting includes a differential amplifier circuit.

3. An intermediate-frequency amplifying circuit as specified in claim 1 wherein said means for converting consists of a secondary winding of an intermediate-frequency transformer forming a part of said amplitude limiter, said secondary winding having a neutral terminal whereby said two signals are drawn out from across said neutral terminal and the two winding ends of said secondary winding.

4. An intermediate-frequency amplifying circuit as specified in claim 1 wherein said reactance circuit comprises one capacitor and at least one parallel circuit consisting of a capacitor and a reactor, said one capacitor and said parallel circuits being connected in series.

5. An intermediate-frequency amplifying circuit as specified in claim 4 wherein said reactance circuit comprises at least two series connected parallel circuits, each of said parallel circuits consisting of a capacitor and a reactor.

* * * * *